3,345,496
CAST IRON ELECTRODE

Charles E. Rogers, Bayside, and Joseph F. Quaas, Island Park, N.Y., assignors to Eutectic Welding Alloys Corporation, Flushing, N.Y., a corporation of New York
No Drawing. Filed Nov. 19, 1963, Ser. No. 324,817
4 Claims. (Cl. 219—146)

ABSTRACT OF THE DISCLOSURE

Cast iron welding electrode comprising a mild steel tube and a filler mixture inserted therein comprising carbon, high carbon iron powder, silicon and graphitizing agents.

---

This invention pertains to a cast iron arc welding electrode, and more particularly to the deposition by means of open arc welding of weld metal having the properties of cast iron.

An object of this invention is to provide a welding electrode that deposits ductile cast iron.

In accordance with this invention a cast iron welding electrode includes a mild steel tube and a filler mixture inserted within it incorporating the following constituents in the indicated ranges of percentages by weight of the overall electrode.

| Constituents: | Percent by weight |
|---|---|
| Carbon | 2–4 |
| High carbon iron powder | 42–36 |
| Silicon | 4–3 |
| Other graphitizing agents | 2–3 |

The balance of the electrode being the mild steel tube.

A particularly effective form of this invention incorporates the following constituents in the indicated ranges of percentages by weight of the electrode.

| Constituents: | Percent by weight |
|---|---|
| Carbon | 3.0–3.5 |
| High carbon iron powder | 38–37.5 |
| Silicon | 2.5–3.0 |
| Other graphitizing agents | 1.5–2.0 |

The mild steel tube may advantageously incorporate from 2.5–6.0% by weight of carbon, and particularly advantageously from 3–4% by weight of carbon. The other graphitizing agents may effectively be manganese, phosphorus, nickel or copper.

The present invention is concerned with the deposition of gray cast iron. Gray cast iron differs from white cast iron in physical properties which are directly related to the amount of carbon combined with the iron. Whereas all the carbon in white cast iron is essentially combined with the iron or accessory alloying elements and this condition tends to produce a martensitic type of structure, white cast iron is generally hard and brittle, having very low ductility.

By this invention using a tubular wire formed from a carbon steel strip, the graphitizers and other desirable alloys are added in the form of granules to the strip as it is being formed into a tube. The steel strip is fed into the tube forming rolls as a flat material. The first set of rolls turns up the sides of the strip to form a shallow trough; the second set deepens the trough, turning the sides up higher and straight to form the strip into the shape of a U. When the U is formed the open tube passes an endless belt which receives alloying mixtures from a hopper, conveying these mixtures in a uniform column down the belt and spilling them into the U shaped tube as it passes. Following this, several sets of rolls crimp, close and tighten the tube solidly around the contained alloys. The mechanical components involved in this operation are so designed as to meter the alloy mixtures into the tube at a constant rate and the proper balance between steel strip and filler material is thus uniformly maintained.

Phosphorus is used not only as a graphitizer but for its ability to provide fluidity. Nickel and copper are also effective graphitizers.

This invention therefore makes it possible to deposit cast iron containing sufficient carbon, silicon and associated elements in proper combination to create a composition which will precipitate free graphite on cooling. The deposited composition is therefore a remarkably ductile and machinable cast iron that is highly compatible with cast iron parent materials.

What is claimed is:

1. A cast iron welding electrode consisting essentially of a mild steel tube and a filler mixture inserted within it, said filler mixture incorporating the following constituents in the indicated ranges of percentages by wieght of the overall electrode, and the balance consisting essentially of said mild steel tube.

| Constituents: | Percent by weight |
|---|---|
| Carbon | 2–4 |
| High carbon iron powder | 42–36 |
| Silicon | 4–3 |
| Other graphitizing agents selected from the group consisting essentially of manganese, phosphorus, nickel and copper | 2–3 |

2. A cast iron welding electrode consisting essentially of a mild steel tube and a filler mixture inserted within it, said filler mixture incorporating the following constituents in the indicated ranges of percentages by weight of the overall electrode, and the balance consisting essentially of said mild steel tube.

| Constituents: | Percent by weight |
|---|---|
| Carbon | 3.0–3.5 |
| High carbon iron powder | 38–37.5 |
| Silicon | 2.5–3.0 |
| Other graphitizing agents selected from the group consisting essentially of manganese, phosphorus, nickel and copper | 1.5–2.0 |

3. An electrode as set forth in claim 1 wherein said mild steel tube incorporates from 2.5–6.0% by weight of carbon.

4. An electrode as set forth in claim 3 wherein said mild steel tube incorporates from 3–4% by weight of carbon.

References Cited
UNITED STATES PATENTS

| | | | |
|---|---|---|---|
| 1,629,748 | 5/1927 | Stoody | 219—146 |
| 1,650,905 | 11/1927 | Mills | 219—146 |
| 2,944,142 | 7/1960 | Sjoman | 219—146 |
| 3,253,120 | 5/1966 | Clauseen | 219—146 X |

RICHARD M. WOOD, *Primary Examiner.*

B. A. STEIN, *Assistant Examiner.*